2,750,304

PRESSURE-SENSITIVE ADHESIVE TAPE AND METHOD OF MAKING

James O. Hendricks, White Bear Lake, William E. Lundquist, Savage, and Ambrose F. Schmelzle, St. Paul, Minn., assignors to Minnesota Mining & Manufacturing Company, St. Paul, Minn., a corporation of Delaware No Drawing. Application June 19, 1952,
Serial No. 294,473

5 Claims. (Cl. 117—76)

This invention relates to pressure-sensitive adhesive tapes having a unified fibrous backing, unification being accomplished by impregnation with a soluble amide-ester polymer composition followed by curing of the polymer to a solvent-resistant, tough and flexible state.

The unified fibrous backing is solvent-resistant, flexible and conformable, weather-resistant, and does not delaminate when the tape is stripped from surfaces to which temporarily adherently applied. Its resistance to solvent is such that lacquer and paint solvents, and in particular soluble color components of colored lacquers, are prevented from seeping through the tape product and defacing the underlying surface. Hence the pressure-sensitive adhesive tapes of this invention are useful as masking tapes and as easily applied oil-resistant protective coverings. Many of these backings are weather-resistant, and do not soften or disintegrate under long-continued exposure to water, or resinify and become brittle or powdery on long-continued exposure to sunlight or abnormally high atmospheric temperatures; hence these pressure-sensitive adhesive tapes are useful for outdoor applications in attaching posters to walls and windows, in sealing packages for shipment or storage, and in other ways. Many of the compositions employed in providing these novel tape backings provide exceptionally high dielectric strength in addition to oil-resistance and weather-resistance; hence such pressure-sensitive adhesive tapes are also useful for various applications as electrical insulation, particularly since the cured polymeric impregnant contains no sulfur and is non-corrosive to copper wires.

The adhesive tape products of the invention are produced by firmly adhesively bonding to the impregnated and cured fibrous web a coating of a suitable pressure-sensitive tape adhesive, of which many suitable varieties are known. Primer compositions may be applied to the web prior to the adhesive coating, and low-adhesion sizing compositions may be applied to the reverse side of the web, in accordance with well-known practice, where such additions are necessary or desirable. The adhesive coating may be transparent, opaque, or colored. The unified web may likewise be colored if desired, and may be printed or decorated, all as will be apparent to those familiar with the pressure-sensitive adhesive tape art. However these variations form no part of the present invention, which is primarily concerned with the novel unified fibrous backing and its preparation, specific but non-limitative examples of which will now be presented.

Example 1

|  | Mols | Parts by weight |
|---|---|---|
| Phenylethanolamine | 5 | 691 |
| Monoethanolamine | 5 | 306 |
| Sebacic acid | 9.1 | 1,840 |
| Maleic anhydride | 0.9 | 88 |

The reactants were heated together in the presence of 260 parts by weight of xylol in a closed container under a nitrogen atmosphere and with continuous stirring, the resulting vapors being continuously condensed, the xylol returned to the reaction vessel, and the water removed as formed. Portions of the xylol were later removed periodically to allow the temperature slowly to increase to the desired point. The batch was heated for two hours from 145 to 175° C., 7½ hours from 165 to 203° C., and 2 hours at 203° C. The product was cooled, and isopropanol was added to a solids content of about 60% as determined by weighing the residue from a weighed sample heated to constant weight in an oven at 100° C. The resulting solution was reddish-brown in color and had a Gardner-Holdt viscosity of Z. The resin had an acid number of 14.

To a portion of the solution was added 3% by weight, based on the solids content, of a soluble heat-reactive melamineformaldehyde resin. The mixture was poured in a thin film on an amalgamated tin plate, dried, and heated for two hours at 115° C. The resulting thin cured film had a tensile strength of 180 lbs./sq. in. at the break point of 605% elongation and a modulus of 56 lbs./sq. in. at 100° elongation, as measured on a Scott Inclined Plane Serigraph operating at 25° C. and at such a rate that 10% elongation is obtained in from 1 to 4 seconds.

The same resin solution with 6% melamine-formaldehyde resin and cured for 4 hours at 100° C. produced a cured film having a tensile strength of 227 lbs./sq. in. at 460% elongation and a modulus at 100% elongation of 135 lbs./sq. in.

Creped saturating-paper (27 lb. "Duracel" crepe) was impregnated with similarly prepared solutions, about 13.5–14.5 grains of the dry residue being incorporated per 24 sq. in. The solution contained about 40 percent of a mixture of isopropanol and xylol as the volatile solvent, and had a stable viscosity, when stored at normal room temperatures, of about 1500 cps. It was applied to the paper by dipping, excess being removed by means of squeeze rolls. The treated and dried web was then heated for 30 minutes at 250° F. to provide a fully unified backing for pressure-sensitive adhesive tape. Equivalent curing was obtained by heating for 5–6 minutes at 300° F. Heating for longer times had no deleterious effect on the impregnant.

The treated backing was then coated with a pressure-sensitive tape adhesive of the rubber-resin type and made from natural rubber and a neutral tackifier resin, to provide a flexible, solvent-resistant and weather-resistant, pressure-sensitive adhesive tape.

Two percent of melamine-formaldehyde resin added to the amide-ester polymer in the impregnating solution provided a highly flexible sheet which was not completely solvent-resistant. Four percent of the melamine-formaldehyde resin provided complete solvent and oil-resistance and the tape was suitable for use as a masking tape in the spray-coating of colored lacquers. Above about 6% of the aldehydic curing agent, the tape became increasingly less flexible.

The same compositions have been employed to impregnate and unify other fibrous webs in the production of backings for pressure-sensitive adhesive tape. Porous flat rope paper ("Flexrope"), for example, has been thus treated to provide backings having high tensile strength as well as excellent solvent-resistance.

In a variation of this example, the resin was produced by a two-stage process in which the maleic anhydride was withheld until the remaining ingredients had been well reacted together. The maleic anhydride was then added and heating continued to the same acid number shown above. The resin formed a smooth solution in isopropanol:xylol solvent. Melamine-formaldehyde resin was added in the amount of 4% and the solution used to impregnate 26 lb. "Duracel" as in the example, the sheet being cured by heating for 30 minutes at 250° F. The resulting tape product was not as effective in resistance to solvent as was the comparable product in the production of which all of the polymer-forming components were simultaneously heated together.

*Example 2*

|  | Mols |
|---|---|
| N-butylethanolamine | 1.36 |
| Monoethanolamine | 1.36 |
| Sebacic acid | 2.47 |
| Maleic anhydride | .246 |

The reactants were heated together, in the presence of xylol as in Example 1, for 3 hours at 133–160° C., 2½ hours at 160–180° C., 1¾ hours at 180–200° C., and 1¾ hours at 200–206° C. The resin had an acid number of 13.8. Solvent, consisting of equal volumes of isopropanol and xylol, was added to provide a solution having a solids content of 60% and a Gardner-Holdt viscosity of Z–4. Addition of 4% of soluble heat-reactive melamine-formaldehyde resin ("Melmac 248-8") and heating in thin film form for 30 minutes at 250° F. produced a cured film having a modulus at 100% elongation of 75 lbs./sq. in. and a tensile strength of 213 lbs./sq. in. at 775% elongation. The curable solution was slightly too viscous for best operation but was effective as an impregnant for porous paper in the prepartion of a unified tape backing having a high degree of solvent-resistance as well as weather-resistance.

*Example 3*

|  | Mols |
|---|---|
| N-cyclohexylethanolamine | 5 |
| Monoethanolamine | 5 |
| Sebacic acid | 9.1 |
| Maleic anhydride | 0.9 |

The reaction mixture was heated, as in the preceding examples, for 4½ hours at 138–160° C., 1 hour at 160–200°C., and 4 hours at 200–205° C., to yield a polymer having an acid number of 11 and a viscosity, at 60% concentration in a 1:1 mixture of isopropanol and xylene, of Z–2 on the Gardner-Holdt scale.

With 4% of "Melmac 248-8" resin as the aldehydic curing agent, this polymer yielded thin films which after heating for 2 hours at 115° C. were found to have a modulus at 100% elongation of 42 lbs./sq. in. and a tensile strength at break of 180 lbs./sq. in. at 780% elongation. Such a solution was effective as an impregnating and unifying agent for fibrous sheet material, e. g. "Duracel" crepe paper, in the production of solvent-resistant, weather-resistant, tough and flexible tape backings.

Similar results were obtained when 2% of paraformaldehyde was substituted for the 4% of soluble, heat-reactive melamine-formaldehyde resin as the curing agent. The paraformaldehyde was added in the form of a fine powder which appeared to dissolve in the amide-ester polymer solution after standing for a few hours at room temperature.

In place of the N-cyclohexylethanolamine employed in Example 3 other N-substituted alkanolamines such as N-benzylethanolamine, N-phenyldecanolamine and N-phenylpropanolamine have been used. In the case of the N-benzylethanolamine the heating cycle was 2½ hours at 138–150° C., 1 hour at 162–184° C., 1½ hours at 184–202° C. and 3 hours at about 200° C. The acid number of the product was 25.8.

The phenyldecanolamine (omega-anilinodecanol) mixture was heated in 1 hour to 150° C. and for 3½ hours at 150–153° C., 4 hours at 175–200° C. and 14 hours to 200–205° C. Since the reaction was proceeding sluggishly an additional 5% of monoethanolamine was added at this point and the heating continued for 3 hours at 130° C. and 3 hours at 190° C. to produce a polymer having an acid number of 50.

The N-phenylpropanolamine mixture required heating for 6⅓ hours at 135–166° C., 3 hours at 167–197° C. and 7½ hours at 197–207° C. to produce a polymer having an acid number of about 20.

Curing the above three polymers by the addition of 4% of a soluble heat-reactive melamine-formaldehyde resin and heating for 1½ hours at 125° C. produced elastic films resembling those of Example 3. Solutions of these polymers in isopropanol:xylol mixtures and with the addition of suitable quantities of aldehydic curing agents such as the melamine-formaldehyde resin were suitable for the impregnation and unification of fibrous webs in the production of solvent-resistant and weater-resistant adhesive tape backings.

*Example 4*

|  | Mols |
|---|---|
| Phenylethanolamine | 5 |
| Monoisopropanolamine | 5 |
| Sebacic acid | 9.1 |
| Maleic anhydride | 0.9 |

The batch was heated in xylol for 8 hours at 145–169° C., 8 hours at 169–184° C., 8 hours at 184–200° C., and 12 hours at 200° C. The product had an acid number of 14.4, and at a solids content of 60.4% in isopropanol:xylol the Gardner-Holdt viscosity was Z.

After the addition of 4% of a soluble heat-reactive melamine-formaldehyde resin and 0.06% of phthalic acid, the mixture was formed into a thin film and cured by heating for two hours at 115° C. The cured film showed a tensile strength of 163 lbs./sq. in. at 555% elongation, and a modulus at 100% elongation of 75 lbs./sq. in.

The mixture was also used to impregnate 4 mil "Flexrope" flat saturating paper, using 9 grains dry weight per 24 sq. in., and curing by heating for 30 minutes at 250° F. The resulting backing was sized with 1–2 grains of a solution in butanol and xylol of three parts of heat-reactive alcohol-soluble urea-formaldehyde resin ("Uformite F-200-E") and approximately one part of a non-oxidizing castor oil alkyd resin plasticizer ("Paraplex AL-16"), and again heated for 10 minutes at 250° F. The reverse side of the sheet was then coated with a pressure-sensitive tape adhesive of the rubber-resin type to produce a solvent-resistant and weater-resistant pressure-sensitive adhesive tape. The tape had a dielectric strength (breakdown voltage) of 2390 volts, and was particularly useful for fastening copper wires in coil-winding and coil-wrapping operations.

*Example 5*

|  | Mols |
|---|---|
| Phenylethanolamine | 5 |
| Monoethanolamine | 5 |
| Sebacic acid | 9.1 |
| Adduct of rosin and maleic anhydride | .9 |

Heating for 22 hours at 140–150° C., 24 hours at 170–176° C. and 5 hours at 185–190° C. under the action of a stream of nitrogen introduced to agitate the mixture and to assist in the removal of water produced a soft, pliable semi-solid product having an acid number of 35. The addition of 15% of a soluble heat-reactive urea-formaldehyde resin produced a curable mixture which when heated in the form of a thin film for 6 hours at 105° C. provided a cured film having a tensile strength of 172 lbs./sq. in. at 400% elongation, and a modulus at 100% elongation of 80 lbs./sq. in. Such a mixture was dissolved in isopropanol-xylol to provide a concentrated fluid solution which was effective as an impregnating and unifying agent for fibrous tape backings.

The adduct of rosin and maleic anhydride is a brittle resinous product obtained on heating together equimolar proportions of the two reactants. Adducts of maleic anhydride with other conjugated dienes, e. g. butadiene, cyclopentadiene, and terpenes, are also effective, as are itaconic and citraconic acids.

Example 6

The substitution of fumaric acid for the maleic anhydride of Example 1 in an equal molar amount provided a mixture which when reacted in a similar manner by heating in xylol for 24 hours at 135–140° C., 7 hours at 167–173° C. and 7 hours at 190–198° C. provided a polymer having an acid number of 34, and which cured in the presence of 10% of soluble, heat-reactive urea-formaldehyde resin, when heated in the form of a thin film for 7 hours at 105° C., to a rubbery film having a tensile strength of 190 lbs./sq. in. at 360% elongation, and a modulus at 100% elongation of 86 lbs./sq. in. The polymers of this example were equally as effective as those of Example 1 as impregnants for tape backings.

Example 7

| | Mols |
|---|---|
| Phenylethanolamine | 5 |
| Monoethanolamine | 5 |
| Sebacic acid | 4.54 |
| Dimerized fatty acids | 2.27 |
| Adipic acid | 2.27 |
| Maleic anhydride | .9 |

The dimerized fatty acids are prepared by polymerization of the fatty acids of drying or semi-drying oils, e. g. linseed, soybean, or cottonseed oil, by any of a number of well-known methods; see, for example, the article by C. G. Goebel entitled "Polymerization of unsaturated fatty acids," appearing in the March, 1947 issue of the Journal of the American Oil Chemists' Society. The amount employed is calculated on the basis of the analytically determined acid number. Such dimers may contain traces of residual conjugated unsaturation but, for the purposes of this invention, may be considered to be essentially free of such unsaturation.

The reaction was carried out in a manner similar to that employed in Example 1, the heating cycle being 6 hours at 156–200° C. and 1 hour at 200° C. The product had an acid number of 14.3. When it was diluted to 58.5% solids in isopropanol:xylol, the solution had a Gardner-Holdt viscosity of X. A film was cast from a sample to which had been added 4% of soluble, heat-reactive melamine-formaldehyde resin and .06% of phthalic acid. After being cured for 2 hours at 100° C. the film had a tensile strength of 192 lbs./sq. in. at 830% elongation and a modulus at 100% elongation of 55 lbs./sq. in.

The solution containing the aldehydic curing agent could be employed in the impregnation of saturating-paper by methods described under Example 1 to produce equally effective tape backings.

Example 8

| | Mols |
|---|---|
| Phenylethanolamine | 5 |
| Monoethanolamine | 4.1 |
| 1,3-diaminobutane | .9 |
| Sebacic acid | 10 |

The reactants were mixed together in xylol and the mixture heated for 5 hours at 147–168° C. and 21 hours at 180–208° C. A small portion of the amino constituents was lost, apparently by volatilization, during the early part of the heating cycle, and hence an additional .07 mols of monoethanolamine was added and the heating continued for 7 hours at 190–195° C. The polymeric product was diluted with isopropanol to approximately 60% concentration and 6% of soluble heat-reactive melamine-formaldehyde resin together with .12% of oxalic acid as a catalyst was added, the percentages being based on the non-volatile content. A film of this solution when cured for 2 hours at 115° C. exhibited a tensile strength of 164 lbs./sq. in. at 680% elongation, and a modulus at 100% elongation of 56 lbs./sq. in. Saturating-paper treated with such a solution and heated as in earlier examples was solvent-resistant and weather-resistant and provided a suitable base for pressure-sensitive masking tapes and the like.

The complete absence of acidic components containing no conjugate unsaturation ordinarily results in a polymer which, on standing, slowly crystallizes or at least becomes less elastic, and which is therefore less desirable as a saturant for tape backings. The addition of 1,3-diaminobutane, or other equivalent unsymmetrical diamine, e. g. 1,3-diaminopentane or N-ethyl ethylenediamine, in molar proportions of about 5–10% of the total amine-alcohol portion of the batch, effectively overcomes such tendency.

Example 9

| | Mols |
|---|---|
| Ortho-tolylisopropanolamine | 5 |
| Monoethanolamine | 5 |
| Sebacic acid | 9.1 |
| Maleic anhydride | .9 |

The above components were mixed together in xylol solution and heated as in Example 1 to produce a polymer having an acid number of 19.6 and a Gardner-Holdt viscosity of Z to Z–1 at 60% concentration in isopropanol:xylol. The polymer cured, when heated with 4% of soluble heat-reactive melamine-formaldehyde resin, to a thin film having a tensile strength of 175 lbs./sq. in. at 720% elongation, and a modulus at 100% elongation of 100 lbs./sq. in. The solution was effective as an impregnant for saturating-paper in the production of unified fibrous tape backings.

Example 10

| | Mols |
|---|---|
| Monoethanolamine | 5 |
| 2-amino-2-methylpropanol | 5 |
| Sebacic acid | 8 |
| Maleic anhydride | 2 |

Heating the mixture for 12 hours from 140° to 200–210° C. in the presence of xylol produced a polymer having an acid number of 36 and a Gardner-Holdt viscosity of Z–1 to 60% concentration in a mixture of equal volumes of isopropanol and xylol. The addition to this solution of 4%, based on the solids content, of soluble heat-reactive melamine-formaldehyde resin produced a mixture which could be cured in thin film form by heating for 1½ hours at 125° C., or for 2 hours at 100° C., to provide a tensile strength of 124 lbs./sq. in. at 460% elongation and a modulus at 100% elongation of 88 lbs./sq. in. The solution was effective as an impregnant for fibrous tape backings.

Example 11

| | Mols |
|---|---|
| Phenylethanolamine | 7 |
| Monoethanolamine | 3 |
| Sebacic acid | 8 |
| Maleic anhydride | 2 |

Reaction as previously described provided a polymer having an acid number of 5.4 and a Gardner-Holdt viscosity at 57% in isopropanol:xylol of R to S. Curing for 2 hours at 100° C. with 6% of melamine-formaldehyde condensate produced thin films having a tensile strength of 156 lbs./sq. in. at 520% elongation, and a modulus at 100% elongation of 98 lbs./sq. in. The solution was useful as a unifying impregnant for fibrous tape backings.

Example 12

| | Mols |
|---|---|
| 2-amino-1-butanol | 10 |
| Sebacic acid | 9 |
| Fumaric acid | 1 |

The components were simultaneously heated together in the presence of xylol to provide a low-acid-number polymer which was soluble in isopropanol:xylol mixtures and could be cured by heating with small amounts of aldehydic curing agents such as soluble heat-reactive aminoaldehyde resins to provide flexible and elastic films. Such a solution could likewise be used in the manner hereinbefore described as a curable impregnant for paper in the production of solvent-resistant and weather-resistant unified paper tape backings.

*Example 13*

|   | Mols |
|---|---|
| 2-amino-1-butanol | 5 |
| Monoethanolamine | 5 |
| Sebacic acid | 9 |
| Fumaric acid | 1 |

The reaction procedure employed was similar to that of Example 12. The polymer was less readily soluble than that of Example 12, and when cured, lost its initial rubbery properties after several weeks at room temperature.

When an attempt was made to cure the polymers of these two examples, 12 and 13, by means of peroxide curing agents, e. g. 3% of lauroyl or benzoyl peroxide, no evidence of curing was obtained.

*Example 14*

|   | Mols |
|---|---|
| Monoisopropanolamine | 10 |
| Adipic acid | 5 |
| Dimerized fatty acids | 4.1 |
| Maleic anhydride | .9 |

The polymer prepared, by methods hereinbefore described, from the above components, and which was soluble in isopropanol:xylol mixtures, was found to cure when heated for 2 hours at 100° C. with 4% of melamine-formaldehyde resin and to provide cured films having a tensile strength of 140 lbs./sq. in. at 750% elongation and a modulus at 100% elongation of 104 lbs./sq. in. The same mixture was suitable as an impregnant for producing unified fibrous tape backings.

The acid portion consists of at least about 80%, and may be made up entirely, of aliphatic dicarboxylic acid, of which adipic acid and sebacic acid are typical examples. The dimer acids (dimerized fatty acids) of Example 7 also come within this class. Succinic and glutaric acids form stable cyclic anhydrides when heated, and also form stable cyclic imides when heated with primary or secondary amines; hence acids having at least four carbon atoms between the carboxyl groups are required.

Carrying out the condensation reaction in the presence of a water-immiscible solvent such as xylol, as illustrated in several of the examples, affords close control of the progress of the reaction and in general is a highly effective and desirable procedure. Equally good results may be obtained, however, by cooking the reactants together in the absence of such solvent, although preferably under an inert atmosphere. The resulting resin is a sticky, stringy liquid at the final reaction temperature, and is somewhat less conveniently soluble than when produced in the presence of xylol.

Paraformaldehyde, and soluble heat-reactive resinous derivatives of formaldehyde and melamine, have been shown to be effective curing agents for the amide-ester polymers here used. Other aldehydes, such as adipaldehyde and glyoxal, and other resinous aldehyde derivatives containing active methylol groups, such as soluble heat-reactive urea-formaldehyde and phenol-formaldehyde resins, have also been found useful. These various aldehydes or derivatives of aldehydes are here identified as aldehydic curing agents.

The action of these aldehydic curing agents in converting the low molecular weight, soluble polymers to the higher molecular weight, insoluble state is speeded up by the catalytic action of a small amount of acidic material such as oxalic, phthalic, salicyclic, lactic, maleic or citric acid.

The properties of the cured films, and hence also of impregnated or treated sheet material carrying the cured polymeric resinous product, are dependent on the amount of aldehydic curing agent employed as well as the nature of the specific curing agent. Increased amounts of curing or cross-linking agent will tend to produce greater stiffness and solvent resistance with a given polymer composition. Dialdehydes such as glyoxal tend to produce a cured product having lower modulus than is obtained by use of a more complex agent of higher functionality such as a soluble heat-reactive melamine-formaldehyde condensate having a multiplicity of active methylol or methylol ether groups on a relatively rigid molecular skeleton. Since phenol-formaldehyde condensates are frequently more readily compatible with the polymers than are the polyaldehydes or the amino-aldehyde condensates, these curing agents may be incorporated in somewhat larger proportions.

The impregnating compositions employed in the preparation of impregnated paper tape backings in accordance with the principles of this invention are required to have certain specific qualities and properties. They must be soluble, or at least dispersible as particles of almost colloidal size, in available volatile solvents, to provide solutions having a solids content of at least about 50% and a viscosity, measured at 100° F., preferably within the range of about 2000–4500 centipoises, and certainly within the range of 1000–6000 centipoises; and the solution must not be unduly "stringy" or "cob-webby" for easy application on squeeze rolls. They must be capable of adhering strongly to the fibers of the fibrous base and must be film-forming. They must be stable at room temperature so that the solution can be stored before using, but must be readily reactive or curable at moderately elevated temperatures suitable for use with the fibrous web employed. When cured, the impregnant must be oil- and solvent-resistant, strong, tough, flexible and stretchable.

These several properties are obtained with those amide-ester polymers as herein identified and exemplified which, when combined with small amounts of aldehydic curing agents and heated in the form of thin films as described in connection with the several examples, provide cured films having at break a tensile strength of at least about 70 lbs./sq. in. and an elongation of at least about 300%, and a modulus at 100% elongation of about 30–160 lbs./sq. in.

The surprising adaptability of these polymeric materials to reaction with aldehydic curing agents and to formation of impregnated fibrous sheet materials having the required combination of properties is not to be found in any prior art disclosures of which we are aware, and is an empirical discovery.

Certain precautions and generalizations to be considered in obtaining the desired soluble curable polymeric impregnants employed in this invention may be mentioned. Linear components, and components providing a higher frequency of polar groups in the polymer chain, tend to produce stiffer and less stretchy cured films. Greater elasticity and softness is obtained by selecting components having side chains or radicals, or a low incidence of polar groups; the same effect is generally obtained by any of several known compositional or procedural devices which destroy the symmetry of the polymer chain. The solubility of the uncured polymer is diminished by increasing the proportion of short linear monoalkanolamine, whereas the substitution for monoethanolamine of branched chain primary alkanolamines such as monoisopropanolamine or 2 - amino - 1 - butanol may improve the solubility of the polymer.

Maleic acid or its anhydride, or other apha, beta-unsaturated dicarboxylic acids, have generally been used in the prior art as a means for obtaining curability of the linear polymer, such further reaction then commonly being carried out through the agency of peroxide-type catalysts. In order to preserve these reactive points of unsaturation in the polymer, prior art workers have found it necessary either to avoid the introduction of primary or secondary amine compounds in the composition, or to carry out the condensation in two stages with the unsaturated acid being incorporated after reaction with the non-tertiary amine is essentially completed. In order to obtain the desirable qualities resulting from incorporation of non-tertiary amines, a two-stage process thus becomes necessary. However it is shown in Example 1 hereinabove that such a two-stage process results in a polymer, and in an impregnated tape backing, having inferior resistance to solvent as compared to the product of the single-stage process. Furthermore it has been shown hereinabove that useful polymers may be provided in the absence of any substantial conjugate unsaturation in the molecule. Such products, while not effectively curable by means of the customary small proportions of peroxide catalysts, nevertheless produce a superior type of unifying impregnation for fibrous backings for pressure-sensitive adhesive tapes when cured with aldehydic curing agents in accordance with the principles of this invention.

It will be apparent from the several examples that the molar quantities of organic acidic reactants and of hydroxyl- and amino-containing reactants are in each case substantially equivalent; i. e. that the number of reactive carboxyl groups available is substantially the same as the number of reactive hydroxyl and amino groups.

The proportions of specific components employed are in each instance such that there is obtained one aldehyde-reactive mono-N-substituted amide linkage, in which a single hydrogen atom it attached to the nitrogen atom, for approximately each 10–50 atoms in the skeletal chain of the polymer.

Within these restrictions, there are obtained compositions which, when reacted as indicated, provide soluble amide-ester polymers having a molecular weight within the range of about 1500–8000 and which, when mixed with small proportions of aldehydic curing agent, applied to fibrous webs such as porous saturating-paper, and cured by heating, provide solvent-resistant and weather-resistant, tough, strong and flexible backings for pressure-sensitive adhesive tapes.

What is claimed is as follows:

1. The method of making a solvent-resistant unified fibrous web suitable for application as a pressure-sensitive adhesive tape backing, comprising: mixing together in solution in a volatile organic solvent a soluble amide-ester polymer as hereinafter defined and a small proportion of an aldehydic curing agent sufficient to produce with said polymer a heat-cured thin film having a modulus at 100% elongation of about 30–160 lbs./sq. in. and a tensile strength of at least about 70 lbs./sq. in. at an elongation of at least about 300%; impregnating a thin porous flexible fibrous web therewith; and then drying and heating the impregnated web to cure the polymer and unify the web; said polymer being a low-acid-number condensation product soluble in isopropanol-xylol and having a molecular weight of about 1500–8000, formed by simultaneously heating together inter-reactive components consisting essentially of substantially equivalent molar quantities of an organic acid portion and an amine-alcohol portion; said acid portion consisting of at least about 80% of aliphatic dicarboxylic acid having at least four carbon atoms between carboxyl groups, any remainder consisting of unsaturated dicarboxylic acid from the class consisting of maleic, fumaric, itaconic and citraconic acids and adducts of maleic anhydride with conjugated dienes; said amine-alcohol portion consisting of components totaling 100% and selected from the following three groups: (1) up to 100% of a non-cyclizable monoalkanolamine having a primary amino group, and, where the amount is more than about 50%, at least that portion in excess of about 50% having a branched chain; (2) up to about 70% of non-cyclizable mono-N-substituted monoalkanolamine having as the alkanol skeletal chain, connecting the nitrogen atom and the hydroxyl group, a plurality of carbon atoms other than four and five, and having directly bonded to the nitrogen atom a single non-tertiary hydrocarbon radical; and (3) up to about 10% of an unsymmetrical alkyl-substituted aliphatic non-tertiary diamine having a non-cyclizable molecule and selected from the class consisting of N-alkyl substituted diamines and diamines having the alkyl substituent on a carbon atom alpha to a nitrogen atom, at least about 5% of said diamine being included in the absence of said unsaturated dicarboxylic acid component; and said inter-reactive components being further so selected and proportioned as to provide one mono-N-substituted amide linkage, in which a single hydrogen atom is attached to the nitrogen, for about each 10–50 atoms in the skeletal chain of the polymer.

2. A solvent-resistant and weather-resistant pressure-sensitive adhesive tape comprising a pressure-sensitive tape adhesive layer firmly adherently bonded to a fibrous backing impregnated and unified with the heat-cured polymeric reaction products of a combination of an amide-ester polymer and a small proportion of an aldehydic curing agent, said combination being capable of producing a heat-cured thin film having a modulus at 100% elongation of about 30–160 lbs./sq. in. and a tensile strength of at least about 70 lbs./sq. in. at an elongation of at least about 300%, said amide-ester polymer being a low-acid-number condensation product, soluble in isopropanol-xylol and having a molecular weight of about 1500–8000, formed by simultaneously heating together inter-reactive components consisting essentially of substantially equivalent molar quantities of an organic acid portion and an amine-alcohol portion; said acid portion consisting of at least about 80% of aliphatic dicarboxylic acid having at least four carbon atoms between carboxyl groups, any remainder consisting of unsaturated dicarboxylic acid from the class consisting of maleic, fumaric, itaconic and citraconic acids and adducts of maleic anhydride with conjugated dienes; said amine-alcohol portion consisting of components totaling 100% and selected from the following three groups: (1) up to 100% of a non-cyclizable monoalkanolamine having a primary amino group, and, where the amount is more than about 50%, at least that portion in excess of about 50% having a branched chain; (2) up to about 70% of non-cyclizable mono-N-substituted mono-alkanolamine having as the alkanol skeletal chain, connecting the nitrogen atom and the hydroxyl group, a plurality of carbon atoms other than four and five, and having directly bonded to the nitrogen atom a single non-tertiary hydrocarbon radical; and (3) up to about 10% of an unsymmetrical alkyl-substituted aliphatic non-tertiary diamine having a non-cyclizable molecule and selected from the class consisting of N-alkyl substituted diamines and diamines having the alkyl substituent on a carbon atom alpha to a nitrogen atom, at least about 5% of said diamine being included in the absence of said unsaturated dicarboxylic acid component; and said inter-reactive components being further so selected and proportioned as to provide one mono-N-substituted amide linkage, in which a single hydrogen atom is attached to the nitrogen, for about each 10–50 atoms in the skeletal chain of the polymer.

3. The method of making a solvent-resistant unified fibrous web as defined in claim 1, in which the aldehydic curing agent is a soluble heat-reactive melamine-formaldehyde resin.

4. The solvent-resistant and weather-resistant pressure-sensitive adhesive tape of claim 2, in which the aldehydic curing agent is a soluble heat-reactive melamine-formaldehyde resin.

5. A solvent resistant unified fibrous web suitable for application as a pressure-sensitive adhesive tape backing and comprising a thin porous flexible fibrous web impregnated and unified with the heat-cured polymeric reaction product of a soluble amide-ester polymer and a small proportion of an aldehydic curing agent sufficient to produce with said polymer a heat-cured thin film having a modulus at 100% elongation of about 30–160 lbs./sq. in. and a tensile strength of at least about 70 lbs./sq. in. at an elongation of at least about 300%; said amide-ester polymer being a low-acid-number condensation product, soluble in isopropanol-xylol and having a molecular weight of about 1500–8000, formed by simultaneously heating together inter-reactive components consisting essentially of substantially equivalent molar quantities of an organic acid portion and an amine-alcohol portion; said acid portion consisting of a least about 80% of aliphatic dicarboxylic acid having at least four carbon atoms between carboxyl groups, any remainder consisting of unsaturated dicarboxylic acid from the class consisting of maleic, fumaric, itaconic and citraconic acids and adducts of maleic anhydride with conjugated dienes; said amine-alcohol portion consisting of components totaling 100% and selected from the following three groups: (1) up to 100% of a non-cyclizable monoalkanolamine having a primary amino group, and, where the amount is more than about 50%, at least that portion in excess of about 50% having a branched chain; (2) up to about 70% of non-cyclizable mono-N-substituted monoalkanolamine having as the alkanol sketetal chain, connecting the nitrogen atom and the hydroxyl group, a plurality of carbon atoms other than four and five, and having directly bonded to the nitrogen atom a single non-tertiary hydrocarbon radical; and (3) up to about 10% of an unsymmetrical alkyl-substituted aliphatic non-tertiary diamine having a non-cyclizable molecule and selected from the class consisting of N-alkyl substituted diamines and diamines having the alkyl substituent on a carbon atom alpha to a nitrogen atom, at least about 5% of said diamine being included in the absence of said unsaturated dicarboxylic acid component; and said inter-reactive components being further so selected and proportioned as to provide one mono-N-substituted amide linkage, in which a single hydrogen atom is attached to the nitrogen, for about each 10–50 atoms in the skeletal chain of the polymer.

References Cited in the file of this patent

UNITED STATES PATENTS

| | | |
|---|---|---|
| 2,379,413 | Bradley | July 3, 1945 |
| 2,484,416 | Martin | Oct. 11, 1949 |
| 2,490,002 | Jayne et al. | Nov. 29, 1949 |
| 2,607,783 | Turinsky | Aug. 19, 1952 |

OTHER REFERENCES

"Oil and Soap J." of April 1944, pages 104–105.